May 15, 1923.
H. B. FINLEY
METHOD OF MANUFACTURING SHEET METAL RECEPTACLES OR CONTAINERS
Filed Jan. 27, 1922
FIG. I.
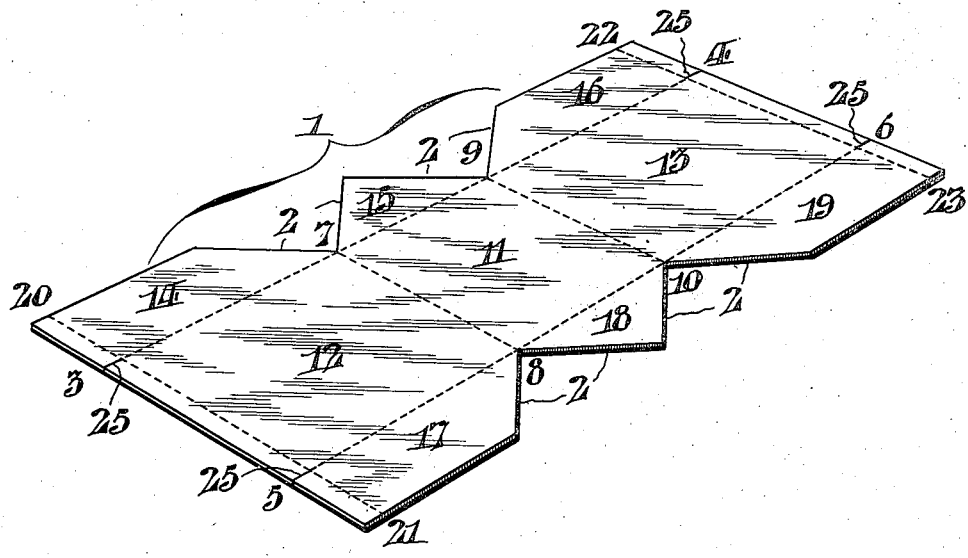
FIG. II.
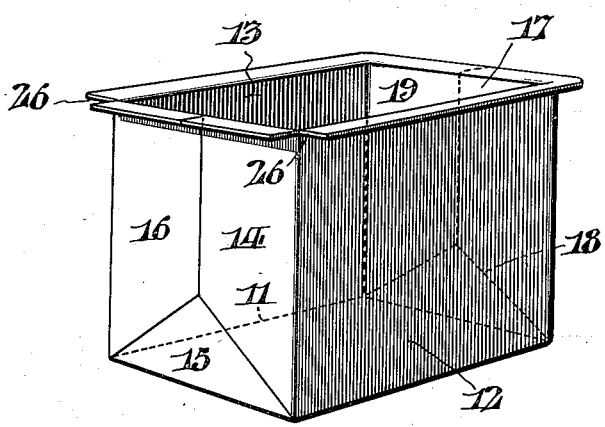
WITNESSES:
INVENTOR:
Henry B. Finley,
BY
ATTORNEYS.

Patented May 15, 1923.

1,455,525

UNITED STATES PATENT OFFICE.

HENRY B. FINLEY, OF CHATTANOOGA, TENNESSEE.

METHOD OF MANUFACTURING SHEET-METAL RECEPTACLES OR CONTAINERS.

Application filed January 27, 1922. Serial No. 532,236.

*To all whom it may concern:*

Be it known that I, HENRY B. FINLEY, a citizen of the United States, residing at Chattanooga, in the county of Hamilton and State of Tennessee, have invented certain new and useful Improvements in the Method of Manufacturing Sheet-Metal Receptacles or Containers, whereof the following is a specification, reference being had to the accompanying drawings.

My invention relates generally to containers or receptacles made of sheet metal, and more especially to those which are formed by bending a blank along certain lines to form the walls and then closing the joints by welding, brazing or the like. Receptacles or containers of the latter type were heretofore constructed with seams or sutures along certain of their corner edges. Where oxygen acetylene or other similar methods of welding are used, a very rough seam is formed, particularly on the inside. On account of its inaccessibility, it is impossible to properly grind or otherwise smooth the seam, since the grinding wheel or implement cannot reach the remote corners of a receptacle when the latter is, for instance, of quadrangular formation.

The paramount object of my invention is to overcome this difficulty and to enable receptacles or containers to be made from a single piece of sheet metal to the avoidance of any sutures or seams whatever along corner edges, making all corner edges perfectly smooth and true, inside and out, and placing the seams on a flat surface where they are accessible for grinding and otherwise smoothing.

Other objects and attendant advantages will become readily apparent from the detailed description of a typical embodiment of my invention which follows:

In the drawings, Fig. I is a perspective view of the sheet metal blank which I employ in producing a receptacle or container in accordance with my invention; and Fig. II is a perspective view showing the manner in which the receptacle or container is formed from said blank.

In carrying out my invention, I cut or otherwise provide a rectangular sheet metal blank 1. Then centrally, of two of its opposite edges, I provide a pair of adjacently disposed V shaped right angle notches 2, 2 of uniform size. The blank is then bent perpendicularly along the parallel lines 3—4 and 5—6 extending through the vertices of adjacent pairs of the notches 2, 2, and also at right angles to these lines along lines 7—8 and 9—10 extending through the vertices of respectively opposite notches. In this way, the bottom 11 and two full sides 12—13 of the receptacle or container structure are formed in combination, while the tabs 14—15—16 and 17—18—19 jointly form the remaining two sides as clearly shown in Fig. II. The parts of the blank are preferably proportioned so as to create a "butt" joint between the tabs 14—15—16 and the same between the corresponding tabs on the other side of the container, it being understood, however, that if desired a lap joint may be formed by providing sufficient material along the joints to permit one tab to overlap the other.

In case a lip or top flange is desired on the receptacle or container, the blank is further bent along lines 20—21 and 22—23 at a distance from and parallel to the edges 3—5 and 4—6 respectively. Incisions or cuts 25 are made back to the lines 20—21 and 22—23 to the depth of the flange margin in coincidence with the lines 3—4 and 5—6 so as to facilitate the subsequent bending operation.

After the structure has been completely formed as noted, the abutting edges of the tabs 17—18—19 and 14—15—16 are united either by soldering or brazing or by fusion of the metal along the sutures as by spot welding, or by fusing additional metal along the seam. In any event, a raised or roughened surface is left along each seam, and the seams are subsequently smoothed by the application of a grinding wheel or other implement. It will be seen that since the seams are all located on flat surfaces at points located between the walls of the container, the seams are easily accessible. The flanging is made continuous by insertion of appropriate corner pieces in the gaps 26—26 shown at the front of Fig. II. After such pieces are welded into place, the corners of the flanging assume the appearance shown at the rear of the figure aforesaid.

By the foregoing method of cutting and bending, I am able to produce in an extremely simple manner a receptacle or container which it will be observed is entirely devoid of sutures or seams along corner edges, the seams extending away from the corners and terminating at points along medial portions of the walls. It will be noted that the point of intersection of the three seams is particularly accessible, which is an advantage as the surface may become particularly roughened at that point in effecting a closed joint.

It is to be understood that I do not limit myself to the particular form of blank shown in the drawing, nor the manner of forming any particular sheet metal container, except in so far as the location of the joints are concerned, when said joints are to be welded, but I desire to include broadly the method described of constructing sheet metal containers generally which consists in ensuring the location of weldable joints on flat surfaces of the container where they are accessible for grinding.

If desired, a metallic container made in accordance with my invention may be finished by application of a coating of suitable enamel so as to be immune against the effect of corrosive solutions. Receptacles of the form herein shown are especially useful to photographers.

Having thus described my invention, I claim:

The method of constructing a receptacle which consists in providing a rectangular sheet metal blank centrally in opposite edges with two adjacent V-shaped notches, bending the blank perpendicularly along parallel lines extending respectively across the vertices of each pair of notches and also along lines at right angles, meeting the vertices of respectively opposite notches without intersecting the sides of the latter, with production of the bottom and four sides of the receptacle having sharp corners, bending the perimetrical edges of the blank outwardly in opposite directions to form flanges defining square recesses at the ends of the flanges, inserting rectangular filling pieces in said recesses, and welding together the edges of the blank, and the filling pieces to the flanges to form an integral structure having a single continuous flange.

In testimony whereof, I have hereunto signed my name at Chattanooga, Tennessee, this tenth day of January, 1922.

HENRY B. FINLEY.

Witnesses:
   JOHN S. FLETCHER,
   BRADLEY L. DUNLAP.